A. W. CRAM.
SEWER TRAP.
APPLICATION FILED JAN. 21, 1910.
1,000,719.
Patented Aug. 15, 1911.
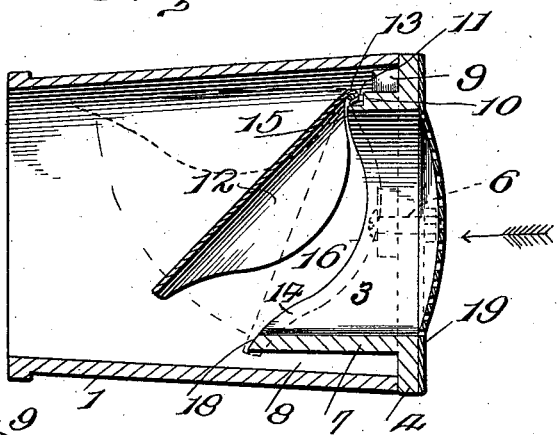
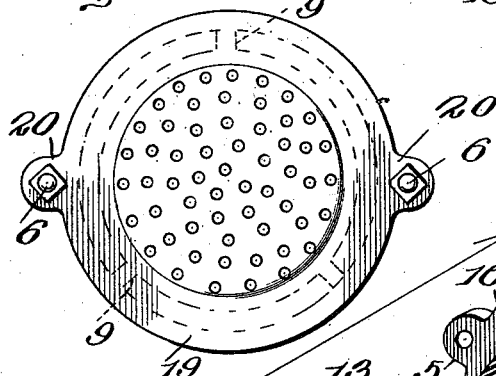
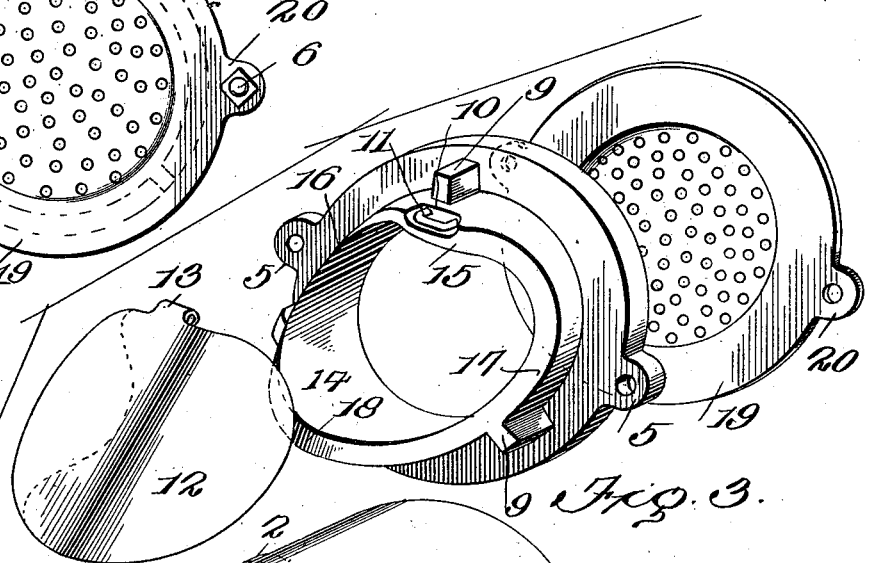
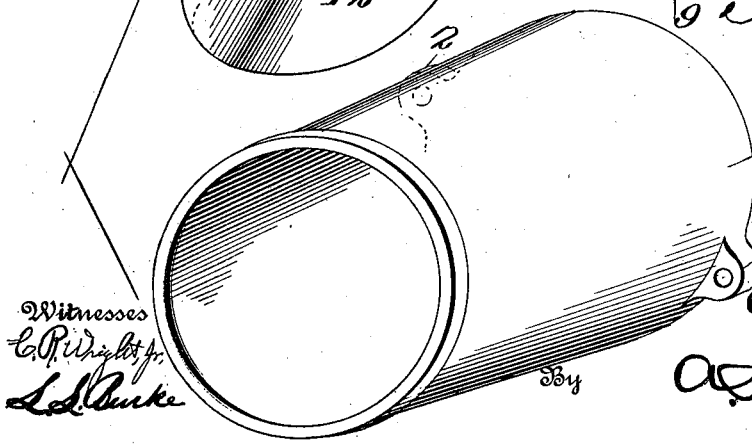
COLUMBIA PLANOGRAPH CO., WASHINGTON, D. C.

UNITED STATES PATENT OFFICE.

ALONZO WHEELER CRAM, OF HAVERHILL, MASSACHUSETTS.

SEWER-TRAP.

1,000,719.   Specification of Letters Patent.   Patented Aug. 15, 1911.

Application filed January 21, 1910. Serial No. 539,323.

*To all whom it may concern:*

Be it known that I, ALONZO WHEELER CRAM, a citizen of the United States, residing at Haverhill, in the county of Essex and State of Massachusetts, have invented certain new and useful Improvements in Sewer-Traps, of which the following is a specification, reference being had therein to the accompanying drawing.

My invention relates to improvements in sewer traps.

The object of my invention is to provide a sewer trap in which a flap valve is so constructed and arranged in a pipe that it can be opened to its full capacity.

Another object is to provide a more simple, cheap and effective trap of this character which can be readily applied to a pipe without any specific construction of the contour of the pipe.

In the accompanying drawings—Figure 1 is a vertical sectional view of a pipe showing my valve and valve seat applied thereto. Fig. 2 is an end view of Fig. 1. Fig. 3 is a perspective detached view of the pipe valve seat, valve and strainer.

Referring now to the drawings, 1 represents a pipe which, as shown, is slightly conical and having at one end the ears 2, by means of which the valve-seat 3 is attached to the pipe. While I have shown this specific means of attaching the valve and valve-seat, it will be understood that the same could be placed between the abutting ends of two pipe sections and clamped between the same or otherwise secured within a pipe section without departing from my invention.

The valve-seat 3 is preferably composed of an annular flange or ring 4, adapted to rest against the end of the pipe section 1 and provided with ears 5 corresponding with the ears 2. By these ears the valve seat is firmly secured to the pipe section 1 by bolts 6, and whereby the valve seat is readily removed when desired. The flange or ring 4, at its inner edge is provided with an inwardly extending tubular member 7, which is of a diameter less than that of the pipe section 1, and leaving the space 8 therein. In order that this tubular member will properly center itself within the tube 1, it is provided with a number of lugs 9, which engage the inner periphery of the pipe and hold it in its proper position, as clearly shown in Fig. 1.

In traps of this character it has been found difficult to so arrange the valve that it can open the full capacity of the pipe and the object of this invention is to provide a very simple structure of the valve and valve-seat, whereby the valve opens the full capacity of the pipe.

The tubular member 7, at its upper end is provided with a cut away portion 10 in which is arranged a loop 11, and upon which is hinged the valve 12, by means of the tongue 13, bent around the loop 11. While I have shown this manner of hinging the flap-valve 12, it will be understood that any form of hinge may be used without departing from my invention. The valve 12 is of a circular or elliptical form curved in cross-section to correspond with that of the interior curve of the pipe 1, whereby the valve may swing upward and lie flat against the inner face of the pipe 1, and thus opening the pipe the full or approximately full capacity thereof.

The valve seat is of an inwardly slanting curved form to correspond with the compound curve of the valve 12, and whereby the valve lies flat against the valve-seat as shown in dotted lines, Fig. 1.

The valve-seat or abutting surface 14 for the valve is convexed at 15, terminating in the concaved portions 16 and 17 on each side and said concaved portions terminating in the convexed central lower portion 18 to correspond exactly to the curves of the outer edge of the valve 12. By this construction it will be seen that the valve lies flat against the seat and completely closes the passage through the pipe and when the valve is opened by pressure of the water, indicated by the arrow in Fig. 1, the valve will or can open so that it will be against or parallel with the wall of the pipe, as shown in dotted line, Fig. 1, and the pipe will be opened to its full capacity.

A strainer 19 is preferably used and is provided with ears 20 through which the bolts 6 pass and thus the strainers and valve are removed when desired.

The tubular member 7, as shown in Fig. 1 of the drawings, is spaced a distance from the pipe 1, so that any slight deposit of sand in the lower portion of the pipe 1, will not interfere with the working of the valve, nor will it interfere with the proper seating of the valve.

Having thus described my invention, what I claim and desire to secure by Letters Patent is—

1. The combination with a pipe, having an annular flange at one end, a tubular member secured to the flange and extending within the pipe and spaced a distance from the interior of the pipe and its end having concave and convex surfaces, and a valve hinged at the upper end of the tubular member and having convex surfaces corresponding with the concave surfaces of the seat and concave surfaces corresponding with the convex surfaces.

2. The combination with a pipe, a tubular member having lugs on its outer face to properly space it from the pipe, means for securing said tubular member to the pipe, the inner end of said tubular member having concave and convex surfaces, and a valve hinged at the upper end of the tubular member and having convex surfaces corresponding with the concave surfaces of the seat and concave surfaces corresponding with the convex surfaces, substantially as described.

3. The combination with a pipe having ears at one end, a tubular member having an outwardly extending flange extending over the end of the pipe and secured to the ears, radially extending lugs adapted to center the tubular member within the pipe and support the same in said position, a strainer secured to the said flange of the tubular member by the same means that secures the pipe and tubular member together, the inner end of the said tubular member having oppositely arranged convex and concave surfaces, and a valve hinged at the upper end of the tubular member and having convex surfaces corresponding with the concave surfaces of the seat and concave surfaces corresponding with the convex surfaces, whereby the valve may seat itself flat against the end of the tubular member and open the full diameter of the pipe.

In testimony whereof I hereunto affix my signature in the presence of two witnesses.

ALONZO WHEELER CRAM.

Witnesses:
WILLIAM D. CRAM,
R. J. HUSTON.

---

Copies of this patent may be obtained for five cents each, by addressing the "Commissioner of Patents, Washington, D. C."